(12) United States Patent
Thomas

(10) Patent No.: US 8,135,673 B2
(45) Date of Patent: Mar. 13, 2012

(54) SYSTEMS AND METHODS FOR DYNAMIC DISPLAY OF REVISION INDICIA

(75) Inventor: Robert N. Thomas, Westminster, CO (US)

(73) Assignee: The Boeing Company, Chicago, IL (US)

(*) Notice: Subject to any disclaimer, the term of this patent is extended or adjusted under 35 U.S.C. 154(b) by 832 days.

(21) Appl. No.: 11/549,583

(22) Filed: Oct. 13, 2006

(65) Prior Publication Data
US 2007/0226605 A1 Sep. 27, 2007

Related U.S. Application Data

(60) Provisional application No. 60/743,638, filed on Mar. 22, 2006.

(51) Int. Cl.
*G06F 17/30* (2006.01)
*G06F 3/048* (2006.01)
(52) U.S. Cl. .................. 707/638; 715/772
(58) Field of Classification Search .................. 707/100, 707/638; 715/772
See application file for complete search history.

(56) References Cited

U.S. PATENT DOCUMENTS

| | | | | |
|---|---|---|---|---|
| 5,715,454 | A * | 2/1998 | Smith | 707/203 |
| 6,968,346 | B2 | 11/2005 | Hekmatpour | |
| 6,978,281 | B1 | 12/2005 | Kruy et al. | |
| 2002/0032707 | A1* | 3/2002 | Takeoka | 707/530 |
| 2004/0103370 | A1 | 5/2004 | Chiang et al. | |
| 2005/0256907 | A1* | 11/2005 | Novik et al. | 707/200 |

FOREIGN PATENT DOCUMENTS
EP 1548610 6/2005

OTHER PUBLICATIONS

Amagasa, et al., "A Data Model for Temporal XML Documents", Database and Expert Systems Applications, 2000, Lecture Notes in Computer Science, vol. 1873, pp. 334-344.
Chawathe, et al., "Representing and Querying Changes in Semistructured Data", Data Engineering Proceedings, 14th International Conference in Orlando, FL, Feb. 23-27, 1998, Los Alamitos, CA, IEEE Computer Soc., 1998, pp. 4-13.
PCT Search Report for PCT Application No. PCT/US2007/004365, mailed Feb. 11, 2008, pp. 1-14.
Bartlett, "An Easy Introduction to XML Publishing—Part 3 of a Five-Part Series", retrieved on Feb. 13, 2006 at http://xml.svs-con.com/read/114133_p.htm, XML Journal, 2005, 6 pages.
Bartlett, "An Easy Introduction to XML Publishing", retrieved on Feb. 13, 2006 at http://xml.svs-con.com/read/48762_p.htm, XML Journal, 2005, 4 pages.

* cited by examiner

*Primary Examiner* — James Trujillo
*Assistant Examiner* — Amresh Singh
(74) *Attorney, Agent, or Firm* — Caven & Aghevli LLC

(57) ABSTRACT

Systems and methods for dynamic display of revision indicia are disclosed. In one embodiment, a method for dynamic display of revision indicia in an information product generated by a publishing system includes determining that at least one element of a structured content has been revised; adding a time-stamp metadata to each element of the structured content; and rendering the structured content for publication, wherein rendering includes comparing the time-stamp metadata of each element with a baseline date; and if the time-stamp metadata indicates that a particular element has been revised subsequent to the baseline date, displaying a revision indicia at least proximate to each element in the information product.

15 Claims, 5 Drawing Sheets

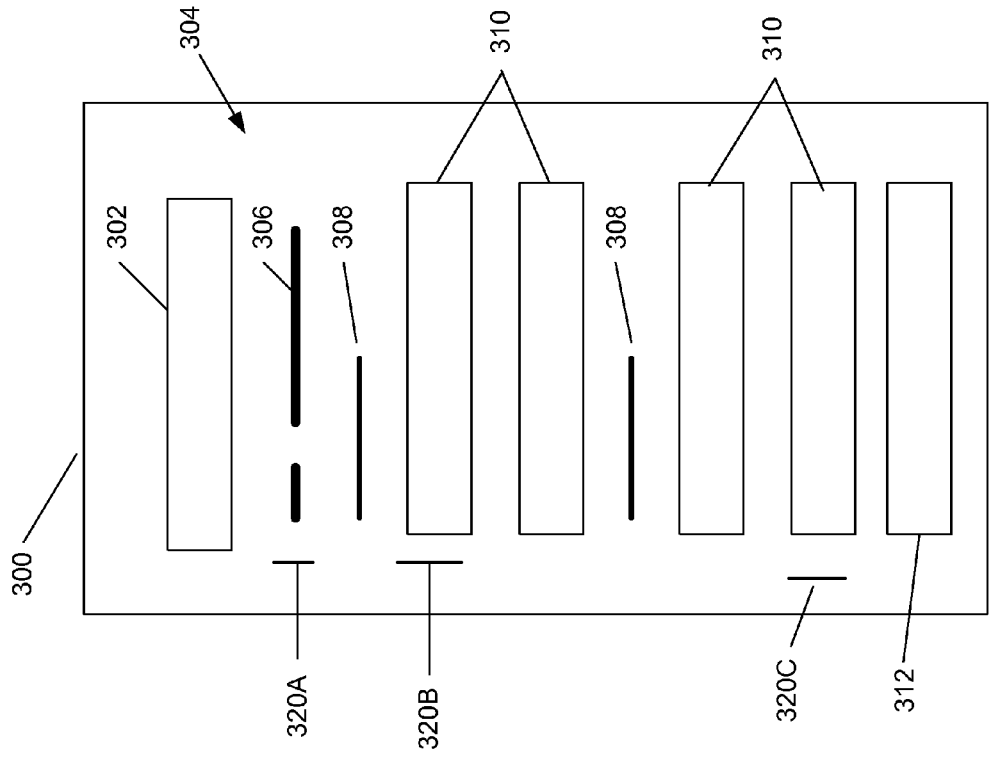
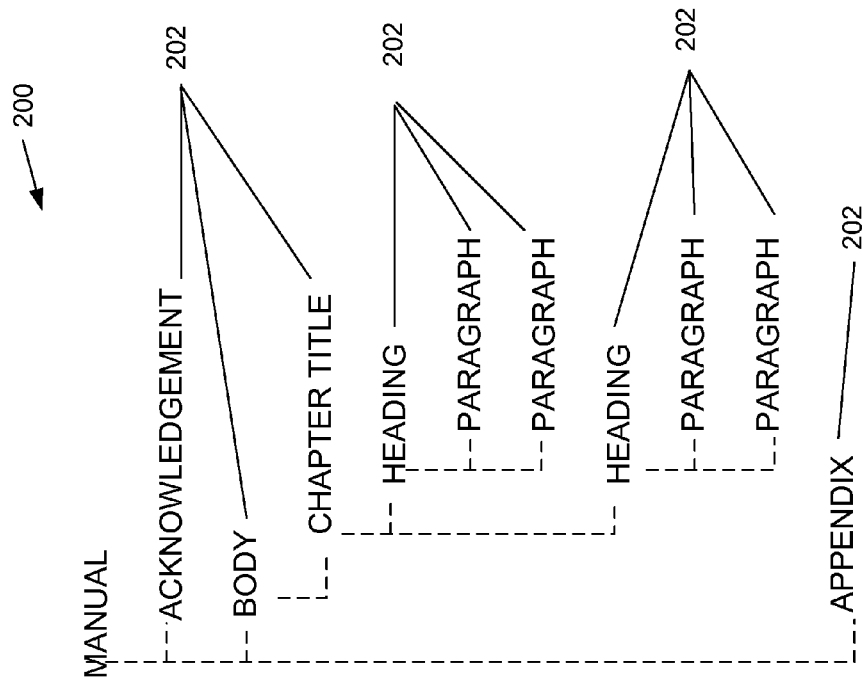

Fig. 5

SYSTEMS AND METHODS FOR DYNAMIC DISPLAY OF REVISION INDICIA

CROSS REFERENCE TO RELATED APPLICATIONS

This patent application claims priority under 35 U.S.C. §120 from U.S. Provisional Application No. 60/743,638 filed Mar. 22, 2006, which provisional application is incorporated herein by reference.

FIELD OF THE INVENTION

The present disclosure relates to publishing systems, and more specifically, to systems and methods for dynamic display of revision indicia.

BACKGROUND OF THE INVENTION

Revision indicia, such as revision bars (or change bars), are commonly placed next to text that has changed since the last time that text was published. In structured publishing systems, revision bar insertion is typically triggered by the presence of semantic markup. Classically, this revision markup is either entered by an author or programmatically inserted by a text-differencing program. During the process of turning structured content, such as XML (Extensible Markup Language), into formatted output (a process known as rendering), the structured publishing system uses the revision markup to control where revision bars are placed in the formatted output.

A variety of publishing systems for presenting information products are known. Such publishing systems may rely upon a repository of information that may be stored in a standardized format, such as XML or SGML (Standard Generalized Markup Language). Examples of existing XML-based publishing systems include those products available from Arbortext, Inc. of Ann Arbor, Mich., and from XY Enterprise, Inc. of Reading, Mass.

Although desirable results have been achieved using such conventional publishing systems, there is room for improvement. For example, there is currently no efficient way of maintaining revision information for multiple information products derived from the same XML source if those information products have different revision cycles.

SUMMARY OF THE INVENTION

The present invention is directed to systems and methods for dynamic display of revision indicia, including, for example, revision bars, highlighting, bolding, changing of text font, underlining, changing of background color, italicizing, or any other suitable revision indicator. Embodiments of the present invention may advantageously allow revision information to be accurately and efficiently maintained for multiple information products derived from a single source of structured content, even when the multiple information products have different revision cycles.

In one embodiment, a method for dynamic display of revision indicia in an information product generated by a publishing system includes determining that at least one element of a structured content has been revised; adding a time-stamp metadata to each element of the structured content; and rendering the structured content for publication, wherein rendering includes comparing the time-stamp metadata of each element with a baseline date; and if the time-stamp metadata indicates that each element has been revised subsequent to the baseline date, displaying a revision indicia at least proximate to each element in the information product.

BRIEF DESCRIPTION OF THE DRAWINGS

Embodiments of the present invention are described in detail below with reference to the following drawings.

FIG. 2 is a schematic view of a data module in accordance with an embodiment of the invention;

FIG. 3 is a schematic view of an information product in accordance with an embodiment of the invention;

FIG. 5 shows an export of revised structured content that includes time-stamp metadata in accordance with an embodiment of the invention.

DETAILED DESCRIPTION

The present invention relates to systems and methods for dynamic display of revision indicia. Many specific details of certain embodiments of the invention are set forth in the following description and in FIGS. 1-6 to provide a thorough understanding of such embodiments. The present invention, however, may have additional embodiments, or may be practiced without one or more of the details described below.

In general, embodiments of the present invention are directed to systems and methods for dynamic display of revision indicia. A wide variety of revision indicia may be used to indicate revisions to an information product, including, for example, revision bars, highlighting, bolding, changing of text font, underlining, changing of background color, italicizing, or any other suitable revision indicator. In the following description, for the sake of simplicity and to facilitate an understanding of the invention, exemplary embodiments of the invention may be described in terms of a particular type of revision indicia, such as, for example, revision bars. It should be appreciated, however, that in alternate embodiments, any suitable revision indicia may be dynamically displayed instead of (or in addition to) revision bars, and that the invention is not limited to those particularly-described embodiments.

Similarly, revision indicia may be used in a wide variety of information products, including, for example, manuals, documents, charts, maps, images, graphs, logs, books, web pages, or any other suitable type of information product. In the following discussion, exemplary embodiments of the invention may be described in terms of a particular type of information product, such as a document. It should be understood that in alternate embodiments of the invention, revision indicia may be dynamically displayed in any type of information product, and that the invention is not limited to the particular types of information products discussed in the following description of exemplary embodiments.

Figure 1:
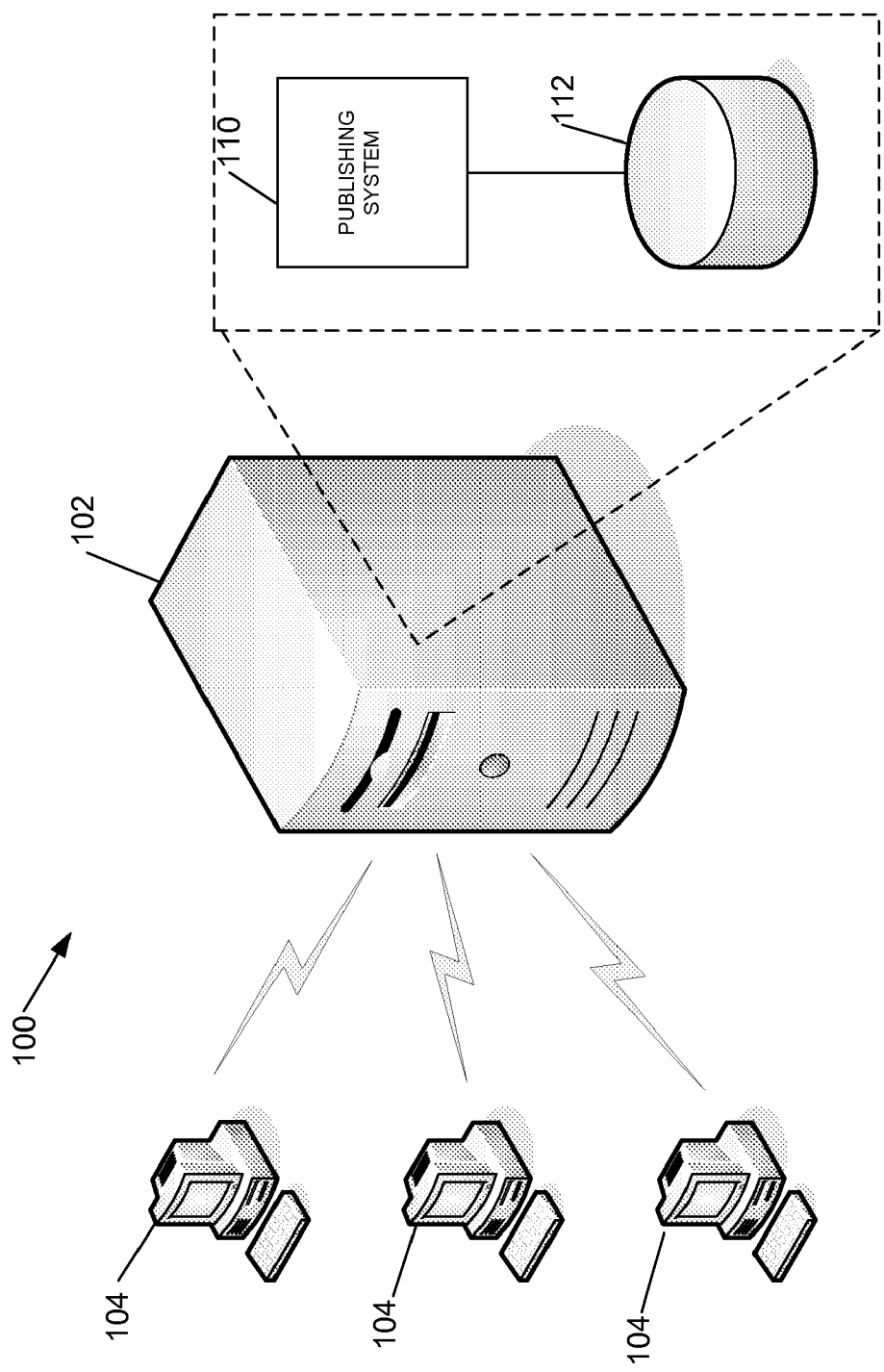
FIG. 1 is a schematic view of a network system in accordance with an embodiment of the invention.

FIG. 1 is a schematic view of a network system 100 in accordance with an embodiment of the invention. In this embodiment, the network system 100 includes a server 102 coupled to a plurality of client computers 104. The server 102 includes a publishing system 110 coupled to a content repository 112. The publishing system 110 enables users on the client computers 104 to create information in reusable modules of data, assemble those data modules for specific purposes or audiences, and publish resulting information products for multiple types of media. The data modules are stored in the content repository 112, which may be internal or external to the server 102.

FIG. 2 is a schematic view of a representative embodiment of a data module 200 that is stored in the content repository 112 of FIG. 1. In this embodiment, the data module 200 represents a document (e.g. a manual, textbook, etc.) having a plurality of elements 202 (e.g. ACKNOWLEDGEMENT, BODY, CHAPTER, TITLE, SECTION, PARAGRAPH, APPENDIX). The data module 200 may be stored in a standardized format, such as XML or SGML, or any other suitable format. As described above, the data module 200 may be accessed, modified, and output by the publishing system 110 in the form of an information product to any suitable output media, including to a display device on the client computer 104.

FIG. 3 is a schematic view of a representative embodiment of an information product 300 generated from the data module 200 by the publishing system 110 of FIG. 1. Corresponding to the data module 200 of FIG. 2, the information product 300 includes an acknowledgement 302, a body 304, a chapter title 306, headings 308, paragraphs 310, and an appendix 312. A plurality of revision bars 320 are provided by the publishing system 110 along the right hand side margin of the information product 300 to reflect those elements 202 of the data module 200 that have been modified or revised since a baseline date. More specifically, a first revision bar 320A is proximate the modified chapter title 306, a second revision bar 320B is positioned proximate a first paragraph 310, and a third revision bar 320C is position proximate a second paragraph 310. In accordance with the present invention, the revision bars 320 are positioned "dynamically" during rendering of the data module 200, as described more fully below.

Figure 4:
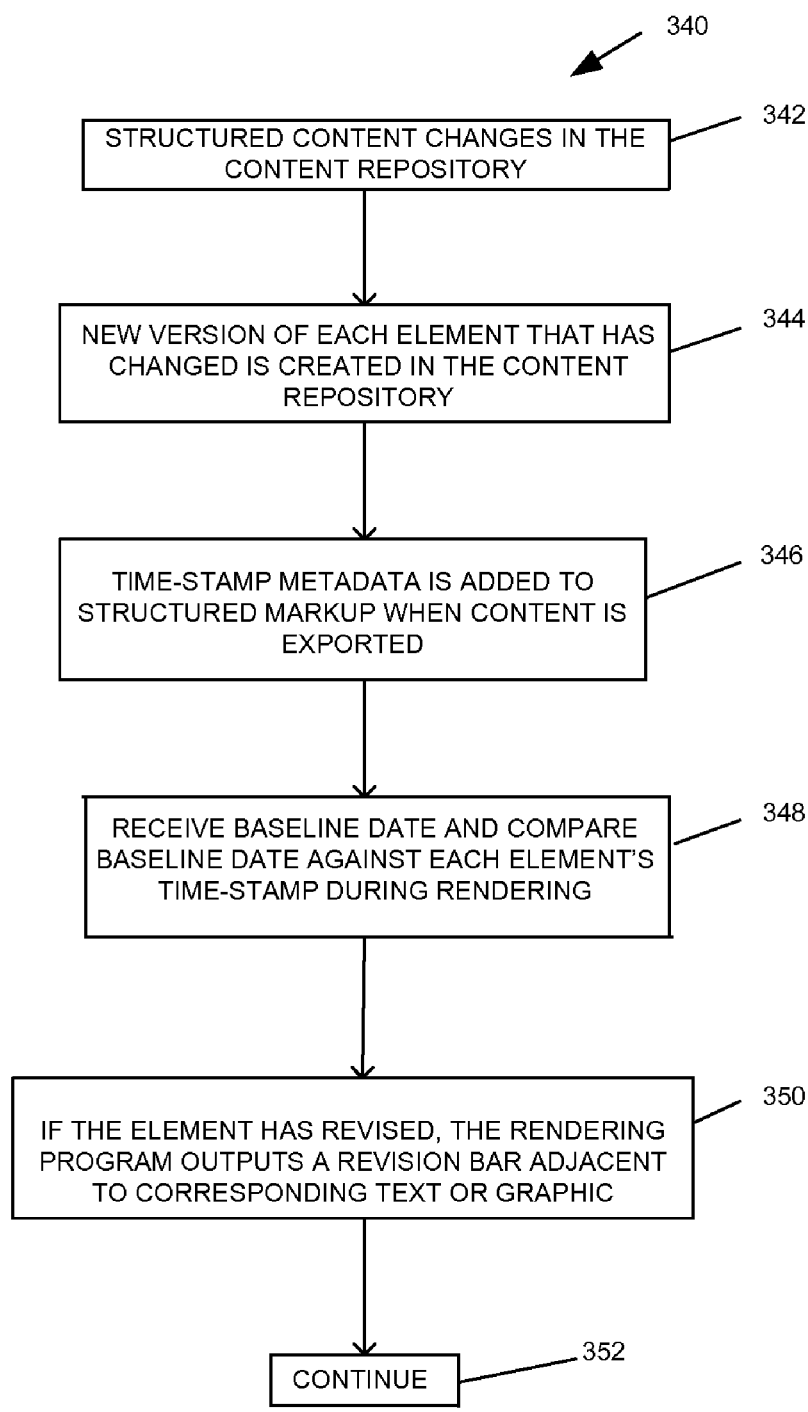
FIG. 4 is a flowchart showing a method for dynamic display of revision bars in accordance with an embodiment of the invention.

FIG. 4 is a flowchart showing a method 340 for dynamic display of revision bars in accordance with an embodiment of the invention. At a block 342, a structured content (e.g. a data module) that was previously created and stored in the content repository 112 is revised or modified. A new version of each element that has changed is created in the content repository 112 at a block 344. Time-stamp metadata, which may be derived from element version-creation times, is added to each structured content (or structured markup) when the content is exported from the content repository 112 for publication, at a block 346.

Figure 5:
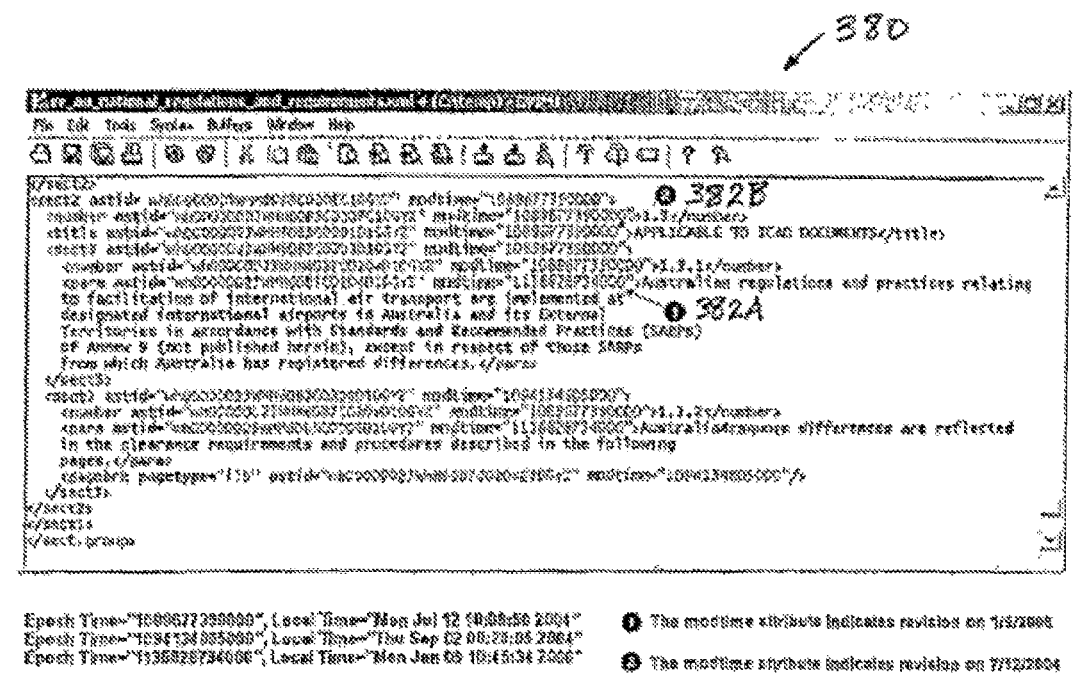

The content repository 112 maintains the structured content and tracks revisions to individual structured-content elements. For example, FIG. 5 shows an export of revised structured content 380 that includes time-stamp metadata 382 in accordance with one embodiment of the invention. More specifically, a first time-stamp metadata 382A uses a modtime attribute to indicate revision of the corresponding first element on Jul. 12, 2004. A second time-stamp metadata 382B uses the modtime attribute to indicate revision of the corresponding second element on Jan. 9, 2006. The structured content 380 is stored on the content repository 112 and may be used for generating multiple information products. In one particular embodiment, the structured content shown in FIG. 5 is XML exported from the Astoria Content Management System, commercially available from Astoria Software, Inc. of San Mateo, Calif. XML attributes "modtime" and "astid" are populated through custom Astoria API code configured to extract the Astoria ID and the modification time from Astoria.

Referring again to FIG. 4, at a block 348, the publishing system 110 receives a baseline date and compares this baseline date against each element's time-stamp metadata during rendering of the structured content to determine whether an element has been revised since the baseline date. The baseline date may be specified by the user at the time of publication, or may be a predetermined or default value. At block 350, if the element has been revised since the baseline date, the rendering program (e.g. style sheet) outputs a revision bar adjacent to the corresponding text or graphic. As noted above, in alternate embodiments, any of a wide variety of revision indicia may be used in place of, or in addition to, revision bars, including, for example, highlighting, bolding, changing of text font, underlining, changing of background color, italicizing, or any other suitable revision indicator.

Embodiments of the present invention may provide significant advantages over the prior art. Because the structured markup in the content repository 112 includes time-stamp metadata which indicates when an element has been revised, the revision bars or other revision indicia may be added dynamically during rendering by comparing the time-stamp metadata with a baseline date. This process allows revision information to be accurately and efficiently maintained for multiple information products derived from a single source of structured content (e.g. XML) even when the multiple information products have different revision cycles.

In one particular embodiment, revision information may be embedded in accordance with the present invention and used to generate change bars (including, for example, the changes, dates of changes, etc.) in electronic documents describing aircraft charts or other classes of aviation documents. In aviation, it is important to have documents, charts, and other aviation information products all be consistent in terms of "effectivity dates." Embodiments of the present invention enable dynamic display of revision indicia based on different date perspectives. This capability advantageously enables a user to have not only the latest changes in the information product, but also have access to the prior data since an airline may be operating with information as of a particular "effectivity date" that precedes the current date. Airlines can operate on different effectivity dates and often may have different versions of charts and aviation information on individual aircraft or Electronic Flight Bags (EFBs). Thus, embodiments of the present invention enable a user to identify the prior changes based on the effectivity date, and then, subsequently see the latest changes when the most recent data becomes effective for use by the airline.

As noted above, embodiments of the invention may be configured for use with aviation charts, maps, and other realizations of aviation data, thereby enabling synchronization of information, regardless of the particular version or update of the data. In this way, the pilot or other end user of the system can see features or changes for multiple effective dates. Embodiments of the invention may also be used to ensure that all applications within an EFB use the same date so that both the map and textual information reference the same information based on a specified date.

For example, a pilot flying into Denver who has not visited the airport in a year can query the document for changes during the past year, and the document will return the text changes and highlight obstructions and other constraints changed during the past year. Thus, embodiments of the present invention may advantageously allow quick evaluation of changes by pilots and others who use the charts or other classes of documents. Of course, as noted above, further embodiments of the invention may be conceived for any other type of information product, including, for example, manuals, documents, charts, maps, images, graphs, logs, books, web pages, or any other suitable type of information product.

Figure 6:
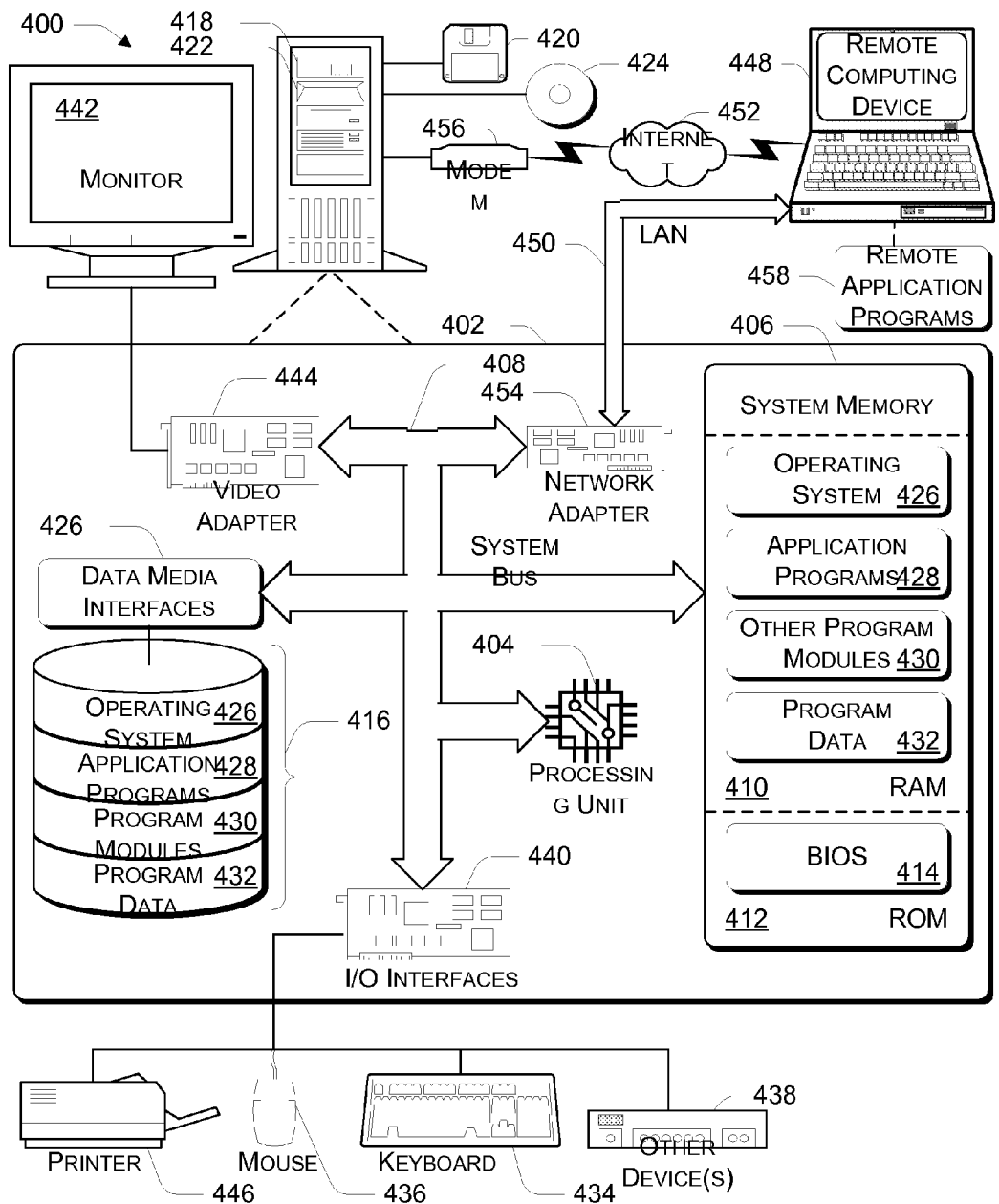
FIG. 6 illustrates a general computer environment, which can be used to implement the techniques described herein.

FIG. 6 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a client 104 or server 102 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 (which may include the content repository 112 of FIG. 1) includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 6 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428 (such as the publishing system 110 of FIG. 1), other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

What is claimed is:

1. A computer implemented method for dynamic display of revision indicia in an information product, comprising:
   receiving, in a content management system, at least one revision to at least one element of a structured content stored in a content repository;
   in response to the revision, creating a new version of the at least one element that was revised in the structured content;
   storing a revision time in association with the at least one element revised in the content repository using an element version creation time, the structured content including revision information for multiple information products that are to be derived from the structured content;
   adding a time-stamp metadata derived from the element version creation time to each element of the structured content when the structured content is exported from the content repository to a publication system for publication, the element version creation time created prior to the time-stamp metadata;
   receiving the content in a publishing system, and, during a rendering process implemented in the publishing system:
      comparing the time-stamp metadata of each element with a baseline date;
      positioning a revision indicia proximate at least one changed element of the structured content that has been revised subsequent to the baseline date, the revision indicia positioned proximate the at least one changed element during the rendering of the structured content; and
   displaying to a display device on a client computer the information product along with the revision indicia.

2. The method of claim 1, wherein the at least one element of a structured content has been revised replaces a previous version of the at least one element of a structured content has been revised in the structured content.

3. The method of claim 1, wherein the content repository is configured to maintain the structured content and track revisions to each element of the structured content.

4. The method of claim 1, wherein the time-stamp metadata includes a modtime attribute to indicate a revision date of each element of the structured content.

5. The method of claim 1, wherein the comparing the time-stamp metadata of each element with the baseline date includes comparing the time-stamp metadata with at least one of a user-defined date, a predetermined date, and a default date.

6. The method of claim 1, wherein the positioning the revision indicia proximate the at least one changed element includes displaying a revision bar proximate the at least one changed element in at least one of a manual, a document, a chart, a map, an image, a graph, a log, a book, and a web page during the rendering of the at least one of a manual, a document, a chart, a map, an image, a graph, a log, a book, and a web page.

7. One or more computer-readable media comprising computer executable instructions that, when executed by a processor configure the processor, to:
   receive, in a content management system executing on the processor, at least one revision to at least one element of a structured content stored to in a content repository;
   in response to the revision, create a new version of the at least one element that was revised in the structured content;
   store a revision time in association with the at least one element revised in the content repository using an element version creation time, the structured content including revision information for multiple information products that are to be derived from the structured content;
   add a time-stamp metadata derived from the element version creation time to each element of the structured content when the structured content is exported from the content repository to a publication system executing on the processor for publication, the element version creation time created prior to the time-stamp metadata;
   receive the content in the publishing system, and, and, during a rendering process implemented in the publishing system:
      compare the time-stamp metadata of each element with a baseline date; and
      display to a display device a rendered version of the structured content, the rendered version including a revision indicia positioned proximate at least one element of the structured content that has been revised subsequent to the baseline date.

8. The one or more computer-readable media of claim 7, wherein the content repository is configured to maintain the structured content and track revisions to each element of the structured content.

9. The one or more computer-readable media of claim 7, wherein the time-stamp metadata uses a modtime attribute to indicate a revision date of each element.

10. The one or more computer-readable media of claim 7, wherein the baseline date comprises at least one of a user-defined date, a predetermined date, and a default date.

11. The one or more computer-readable media of claim 7, wherein the baseline date comprises at least one of a manual, a document, a chart, a map, an image, a graph, a log, a book, and a web page.

12. A computer-based system for dynamically displaying revision bars in an information product generated by a publishing system, comprising:
 a first component configured to:
  receive, in a content management system, at least one revision to at least one element of a structured content stored in a content repository, a revision time of the at least one element reflected in the content repository using an element version creation time;
  in response to the revision, to create a new version of the at least one element that was revised in the structured content; and
  store a revision time in association with the at least one element revised in the content repository using an element version creation time, the structured content including revision information for multiple information products that are to be derived from the structured content;
 a second component configured to add a time-stamp metadata derived from the element version creation time to each element of the structured content when the structured content is exported from the content repository to a publication system for publication, the element version creation time created prior to the time-stamp metadata; and
 a third component configured to:
  receive the content in the publishing system, and, in the publishing system; and
  render the structured content to a display device, wherein rendering includes:
   comparing the time-stamp metadata of each element with a baseline date; and
   positioning a revision indicia proximate each element of the structured content that was revised subsequent to the baseline date, the revision indicia positioned during the rendering of the structured content to the display device.

13. The system of claim 12, wherein the time-stamp metadata uses a modtime attribute to indicate a revision date of each element.

14. The system of claim 12, wherein the third component is further configured to compare the time-stamp metadata of each element with a baseline date that includes at least one of a user-defined date, a predetermined date, and a default date.

15. The system of claim 12, wherein the third component is further configured to display the rendered structured content including the revision indicia as at least one of a manual, a document, a chart, a map, an image, a graph, a log, a book, and a web page.

* * * * *